(No Model.)

H. P. NUSBAUM.
THILL ATTACHMENT FOR HARNESS.

No. 308,849. Patented Dec. 2, 1884.

Witnesses:
A. C. Eader
Jno. E. Morris.

Inventor:
Henry P. Nusbaum
By Chas. B. Mann
Attorney

UNITED STATES PATENT OFFICE.

HENRY P. NUSBAUM, OF MOUNT AIRY, MARYLAND.

THILL ATTACHMENT FOR HARNESS.

SPECIFICATION forming part of Letters Patent No. 308,849, dated December 2, 1884.

Application filed February 27, 1884. (No model.)

*To all whom it may concern:*

Be it known that I, HENRY P. NUSBAUM, a citizen of the United States, residing at Mount Airy, in the county of Carroll and State of Maryland, have invented certain new and useful Improvements in Thill Attachments for Harness, of which the following is a specification.

My invention relates to a thill attachment for harness, and will first be described and then claimed.

Figure 1:
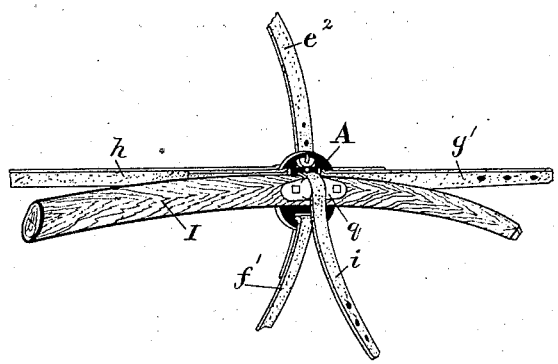
Figure 2:
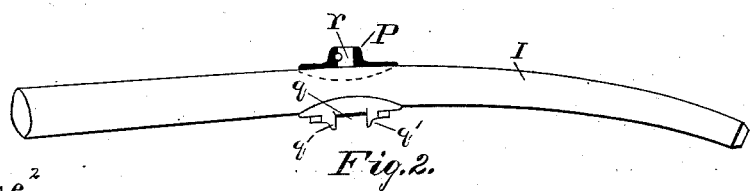
Figure 3:
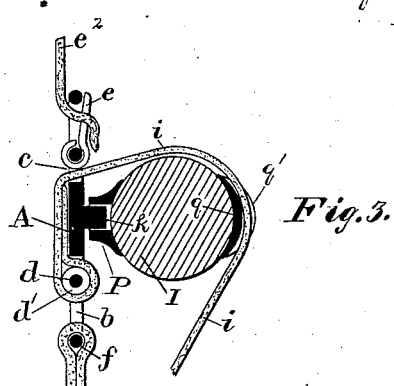
Figure 4:
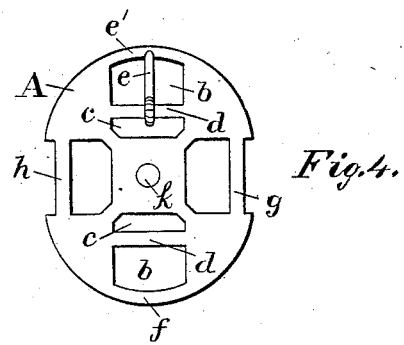
Figure 5:
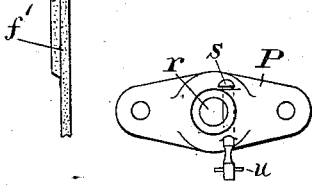
Figures 6, 7:
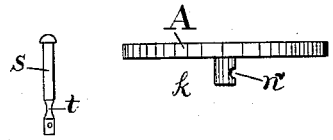

In the accompanying drawings, which illustrate the invention, Figure 1 is a view of the attachment, and showing portions of the harness and one shaft or thill. Fig. 2 is a view of one shaft, provided with the necessary parts comprising a portion of the attachment. Fig. 3 is a view of the attachment in section, and showing the connected straps and one shaft, the latter also in section. Fig. 4 is a front view of the buckle-plate. Fig. 5 is a view of the socket-plate which is attached to the shaft. Fig. 6 is a view separately of the pin which is connected with the socket-plate. Fig. 7 is an edge view of the buckle-plate.

The buckle-plate consists of a plate, A, having four holes or openings, $b$, and two narrower openings, $c$, a bar, $d$, separating each of the latter from one of the adjoining openings $b$. A tongue, $e$, is pivoted on the upper bar, $d$, and its free end bears against the uppermost rim-bar, $e'$, and serves as a buckle to which the harness-saddle strap $e^2$ is attached, said strap being brought into or through the opening $b$. To the lowermost rim-bar, $f$, the saddle-girth $f'$ is attached. To the bar $g$ the trace or tug $g'$ is attached, and thence extends forward to connect with the hames, and to the bar $h$ the holdback-strap $h'$ is attached. It will be seen that the usual long trace which ordinarily extends back and attaches to a single-tree is dispensed with, and that the usual separate device on the shaft to which ordinarily the holdback is fastened is also dispensed with, thereby greatly simplifying the parts, cheapening the harness, and rendering it possible to attach an animal to the shafts with more ease and expedition.

In addition to the straps already named, one other strap, $i$, is employed as a belly-band to hold down the shafts I and keep the plates A and P in engagement. This band $i$ is attached to the lower bar, $d$, (see Fig. 3,) and from thence passes up on the inner side of the buckle-plate A, and through the upper narrow opening, $c$, to the outer side. It is thus in position to pass over the shaft I and under the animal's belly, and when buckled to a like strap on the other side will hold the shafts down and keep the lugs in the sockets. An elastic bushing, $d'$, may be around the bar $d$, and between it and the strap, to prevent the strap from being cut by the bar. All the other straps may be "bushed" in like manner. A lug, $k$, projects from the center of the outer side of the buckle-plate, and has on one side of it a notch, $n$. The two shafts I are each provided on the inner side with a socket-plate, P, and on the outer side with a belly-band holder, $q$. These plates are attached in any suitable manner. The socket-plate has a socket or hole, $r$, into which the lug $k$ enters, as seen in Fig. 3. The engagement of these parts—the lugs on the harness buckle-plates and the socket-plates on the shaft—constitutes the entire coupling or "hitching" between the harness and the vehicle, whereby the vehicle may be drawn forward or pushed backward. The belly-band holder $q$ has a bearing for the strap, and two shoulders, $q'$, at each end of the bearing. The shoulders keep the strap on. It is obvious that, broadly considered, the lug $k$ might be on the shaft-plate P, and the socket $r$ on the harness-plate A, thus simply reversing their position from that shown.

To retain the lug $k$ in the socket-plate, the latter has a pin, $s$, which loosely occupies a hole at one side of the socket $r$, (see Fig. 5,) extending vertically through the plate. This pin near its lower end is reduced in size, forming a notch, $t$. The pin has movement up and down, and when its reduced part or notch $t$ is coincident with the socket $r$ the lug $k$ may enter or withdraw from the socket. When the lug is in the socket it will be retained there by pressing the pin $s$ down so as to bring the upper part or full size of the pin into engagement with the notch $n$ on the lug. The pin has a head at the upper end and a cross-pin, $u$, at the lower end, to keep it in its place.

From the foregoing description the operation and advantages of the improvement will be understood.

Having described my invention, I claim and desire to secure by Letters Patent of the United States—

1. A thill attachment for harness, consisting of a plate, A, on the harness, provided with a lug, k, projecting from its outer side, and having the saddle-strap, girth, trace, and holdback-strap attached, a plate, P, on the shaft I, having a socket for the said lug to enter, and a belly-band, i, connected to the lug-plate, and adapted to pass therefrom over the shaft and under the animal, as shown and described.

2. An attachment for connecting harness to thills, having a plate, A, on the harness, provided with a projecting lug, k, having a side notch, n, and a plate, P, on the shaft, having a socket for the lug to enter, and provided with a loose pin, adapted to move up and down at one side of the socket and engage with the notch on the lug, as set forth.

In testimony whereof I affix my signature in presence of two witnesses.

HENRY P. NUSBAUM.

Witnesses:
    JNO. T. MADDOX,
    JNO. E. MORRIS.